United States Patent
Brown et al.

(10) Patent No.: US 6,710,285 B2
(45) Date of Patent: Mar. 23, 2004

(54) LASER SYSTEM FOR SLAG REMOVAL

(75) Inventors: Robert K. Brown, Neillsville, WI (US); Frank A Cammarata, Jr., Wisconsin Rapids, WI (US)

(73) Assignee: First Call Explosive Solutions, Inc., Wisconsin Rapids, WI (US)

( * ) Notice: Subject to any disclaimer, the term of this patent is extended or adjusted under 35 U.S.C. 154(b) by 0 days.

(21) Appl. No.: 10/160,691

(22) Filed: Jun. 1, 2002

(65) Prior Publication Data

US 2003/0222062 A1 Dec. 4, 2003

(51) Int. Cl.[7] ........................ B23K 26/00; B23K 26/14; B23K 26/16; B23K 26/18
(52) U.S. Cl. ............................. 219/121.68; 219/121.69; 219/121.85
(58) Field of Search ...................... 219/121.68, 121.69, 219/121.85, 121.67

(56) References Cited

U.S. PATENT DOCUMENTS

| | | | |
|---|---|---|---|
| 4,996,951 A | | 3/1991 | Archer et al. |
| 5,113,802 A | * | 5/1992 | Le Blanc .................... 122/379 |
| 5,517,950 A | | 5/1996 | Kendrick |
| 5,549,079 A | | 8/1996 | Johnston, Jr. et al. |
| 5,605,117 A | | 2/1997 | Moskal |
| 5,643,476 A | * | 7/1997 | Garmire et al. ........ 219/121.68 |
| 5,661,304 A | | 8/1997 | Kimura et al. |
| 5,740,745 A | * | 4/1998 | Smyrniotis et al. .......... 110/343 |
| 5,894,806 A | * | 4/1999 | Smyrniotis et al. .......... 110/343 |
| 6,004,398 A | | 12/1999 | Eaton et al. |
| 6,095,096 A | | 8/2000 | Vetterick et al. |
| 6,240,859 B1 | | 6/2001 | Jones, Jr. |
| 6,291,796 B1 | * | 9/2001 | Lu et al. ................. 219/121.68 |
| 6,321,690 B1 | | 11/2001 | Zilka et al. |

FOREIGN PATENT DOCUMENTS

| | | | |
|---|---|---|---|
| DE | 3243808 | * 11/1983 | ............ F27D/23/02 |

* cited by examiner

*Primary Examiner*—M. Alexandra Elve
(74) *Attorney, Agent, or Firm*—Boyle Fredrickson Newholm Stein & Gratz S.C.

(57) ABSTRACT

A system for removing slag from a boiler includes a laser, a targeting system, and a computer system for controlling the operation of the laser and targeting system. Preferably, the laser includes chemicals contained in a mixing pre-chamber. A pump connects to the pre-chamber, and an iodine laser diode connects to the pump. The laser unit also has a power source, cooling system, and a raw beam laser. The targeting system is driven by targeting software and includes an optical targeting system. Preferably, the system also includes a mobile trailer with a computer control room, a main laser operating unit, and a portable optical targeting system connected to the laser unit. Fiber optic cable connects the targeting system and the laser. The online deslagging method includes transporting and setting-up the system, relaying set-up information, feeding targeting information, activating and operating the laser to remove slag from within the boiler.

20 Claims, 6 Drawing Sheets

LASER SYSTEM FOR SLAG REMOVAL

BACKGROUND OF THE INVENTION

1. Field of the Invention

The present invention relates in general to the field of laser cleaning. More particularly, the present invention relates to particulate removal from the heat exchange and other inner surfaces in a boiler. Specifically, a preferred embodiment of the present invention relates to a laser deslagging device for boilers.

2. Discussion of the Related Art

Electrical power generating plants commonly employ systems in which boilers are fueled by coal or oil. These in turn produce steam for driving turbines to produce electricity. Typical boilers include, among other components, a furnace evaporator section and various heat exchange units such as superheaters, reheaters, precipitators, fire boxes, slope area, economizers and, air heater sections. A furnace evaporator section is provided with water walls, while the various heat exchange units include tubing for carrying the medium, in the form of water or steam. These are heated, while combustion gases flow past the water walls and over the tubing.

Despite all efforts to optimize the fuel burning process, all combustion gases contain a certain amount of solid and/or molten particulates, including ash and soot, that form deposits on the water walls and tubing surfaces. These deposits (often referred to as slag) interfere with the transfer of heat energy from the combustion gases to the medium being heated. Moreover, if these deposits are permitted to form a layer of a certain thickness, the outer surface of such layer may reach a temperature at which constituents thereof become sintered or molten. This results in deposits which grow rapidly, resist removal, create partial or total blockages in the gas flow paths of the boiler, result in heavy accumulations which may fall and hence cause mechanical damage within the boiler, create boiler inefficiency, and cause corrosion damage due to diffusion of molten or vapor materials into the tubing surfaces.

A variety of devices and methods are used to clean slag and similar deposits from boilers, furnaces, and similar heat exchange devices. Some of these rely on chemicals or fluids that interact with and erode deposits. Water cannons, steam cleaners, pressurized air, and similar approaches are also used. Some approaches also make use of temperature variations. And, of course, various types of explosives are commonly used to create strong shock waves to blast slag deposits off of the boiler.

The use of explosive devices for deslagging is a particularly effective method, as the large shock wave from an explosion, appropriately positioned and timed, can easily and quickly separate large quantities of slag from the boiler surfaces. However, this process is costly, since the boiler must be shut down (i.e. brought off line) in order to perform this type of cleaning. Thus, valuable production time is thereby lost. This lost production time includes not only the hours during which the cleaning process is being performed, but also the several hours prior to cleaning when the boiler must be taken off line to cool down, and the several hours subsequent to cleaning for the boiler to be restarted and brought into full operational capacity.

This process also presents a degree of danger common to the use of any explosive. Were the boiler to remain on-line during cleaning, the immense heat of the boiler would prematurely detonate any explosive placed into the boiler, before the explosive has been properly positioned for detonation, rendering the process ineffective and possibly damaging the boiler. Worse, loss of control over the precise timing of detonation would create a serious danger for personnel located near the boiler at the time of detonation. Therefore, it has been necessary to shut down any heat exchange device for extended periods of time when explosives-based deslagging is desired.

Sootblowers are devices used to project a stream of blowing medium, such as water, air, or steam, against the heat transfer surfaces of the tube bank located within the boiler. The blowing medium is used to dislodge various combustion byproducts, including soot, slag, and ash, which become deposited on the heat transfer surfaces. By using the blowing medium to dislodge the encrustations, the thermal and mechanical shock provided by the medium fractures the encrustations, breaking them free, and dislodges them from the heat transfer surfaces. Although these devices do not often require the boiler to be shut down, they are often not extremely efficient in their removal of slag. Those devices that employ water or steam further require a drainage device to remove the newly created soot-slurry.

What is needed therefore is a slag removal device that has the ability to remove a high percentage of the slag from a boiler, without requiring the boiler to be shut down. Further, what is also needed is a safe and efficient means to clean a boiler. Heretofore these requirements have not been fully met without incurring various disadvantages.

SUMMARY AND OBJECTS OF THE INVENTION

By way of summary, the present invention is directed to a laser deslagging device for the cleaning of boilers. A primary object of the invention is to provide an apparatus that eliminates slag from on-line boilers and/or furnace component surfaces while in use.

Another important object of the invention is to provide a device, as aforesaid, which utilizes light as the cleaning medium.

A further object of the invention is to incorporate existing laser technology to create a device for cleaning molten slag that builds up in boilers, without causing any damage to the boiler or posing considerable risk to the operators.

Another object of the invention is to provide an apparatus that is ruggedized and reliable, thereby decreasing down time and operating costs. Yet another object of the invention is to provide an apparatus that has one or more of the characteristics discussed above but which is relatively simple to manufacture, transport, operate and assemble.

A preferred embodiment of the invention incorporates laser technology to be used for cleaning slag from a boiler, furnace or similar fuel-burning or incineration device, by directing a laser beam at the part of the boiler to be cleaned for a time sufficient to remove the slag from the substrate. The removal process comprises directing the beam at the area to be cleaned whilst the boiler is in use. The method may comprise operating the boiler in its normal, high temperature condition while the slag removal process occurs.

The deslagging system preferably is comprised of a laser and an operating unit and a machine to transport the system's components. The system also preferably includes a computer with basic laser operational software, a processor, sufficient memory and a database. In one preferred embodiment, the computer is connected to a targeting and imaging system that allows the operator of the laser operating unit to view the inside of the boiler from the computer screen. The computer is also preferably connected to the laser and has a Q-switch which turns the laser operating unit on and off at the command of the operator.

The laser beam may be deployed by a gun, rotating ball or other means of deployment inside the boiler. The laser is preferably connected to the deployment device via fiber optic cabling. The length of the fiber optic cabling allows the laser beam to be transported from the laser to the deployment device.

These, and other, aspects and objects of the present invention will be better appreciated and understood when considered in conjunction with the following description and the accompanying drawings. It should be understood, however, that the following description, while indicating preferred embodiments of the present invention, is given by way of illustration and not of limitation. Many changes and modifications may be made within the scope of the present invention without departing from the spirit thereof, and the invention includes all such modifications.

BRIEF DESCRIPTION OF THE DRAWINGS

A clear conception of the advantages and features constituting the present invention, and of the construction and operation of typical mechanisms provided with the present invention, will become more readily apparent by referring to the exemplary, and therefore non-limiting, embodiments illustrated in the drawings accompanying and forming a part of this specification, wherein like reference numerals designate the same elements in the several views, and in which.

In describing the preferred embodiment of the invention which is illustrated in the drawings, specific terminology will be resorted to for the sake of clarity. However, it is not intended that the invention be limited to the specific terms so selected and it is to be understood that each specific term includes all technical equivalents which operate in a similar manner to accomplish a similar purpose. For example, the word connected or terms similar thereto are often used. They are not limited to direct connection but include connection through other elements where such connection is recognized as being equivalent by those skilled in the art.

DESCRIPTION OF PREFERRED EMBODIMENTS

The present invention and the various features and advantageous details thereof are explained more fully with reference to the non-limiting embodiments described in detail in the following description.

1. System Overview

The present invention comprises a laser deslagging system for cleaning boilers, fireboxes, and slope areas having typical online temperatures between 1900–2500 degrees Fahrenheit. The inventive system is designed to be useful with a variety of boilers. For example, the boiler may be a conventional boiler made of heavy-duty steel plates such as those currently used in the power industry. A firebox and substrate tubes are contained inside the boiler and are generally constructed of steel or stainless steel. The boiler walls preferably have portals to allow for access into the inside of the boiler.

The laser main unit of the present invention may have many useful features. For example, the laser is preferably constructed to meet the temperature requirements of an online boiler. The laser should have enough power to be able to reach a depth of at least 25 feet into the firebox. This distance factor may be addressed by the following formula: Power=Distance×Optics or $P_1 = D_1 \times O_1$. The formula explains the amount of power needed compared to the distance of the target and the size of the optics. The access angles from the portals to the firebox and tubes may be about 30 degrees in order for optimal access to be achieved. The size and strength of the beam of the laser will also be affected by the particulates in the space between the laser and the slag material and is dependent upon how dense the particulates are in that space. Other important factors in determining laser power include: size of particulates in the space while online, tube thickness, types of materials used in constructing the boiler tubes, and the type of slag depending on the type of fuel burned (e.g. bituminous coal and its additives). Thus, the laser must be designed to effectively penetrate this space despite these variables and the possible deflection of the beam due to high angles of attack.

The laser main unit is preferably fixed in a vehicle or trailer so that it is mobile. The laser beam is then run through an optical cable from the main unit to get into range of the boiler's internal structures (e.g., boiler tubes) that are contained inside of the boiler. In this embodiment, the laser beam can be channeled through the cable any distance without significant degradation and is connected to a targeting system. Such a laser is also preferably man portable and easily moved around by a single individual as needed around and in the boiler.

2. Detailed Description of Preferred Embodiments

The construction of lasers and boiler systems is well-known to those skilled in the art and therefore a detailed description thereof is not necessary to fully understand the present invention which is directed to novel improvements in the method of cleaning boilers.

Figure 1:
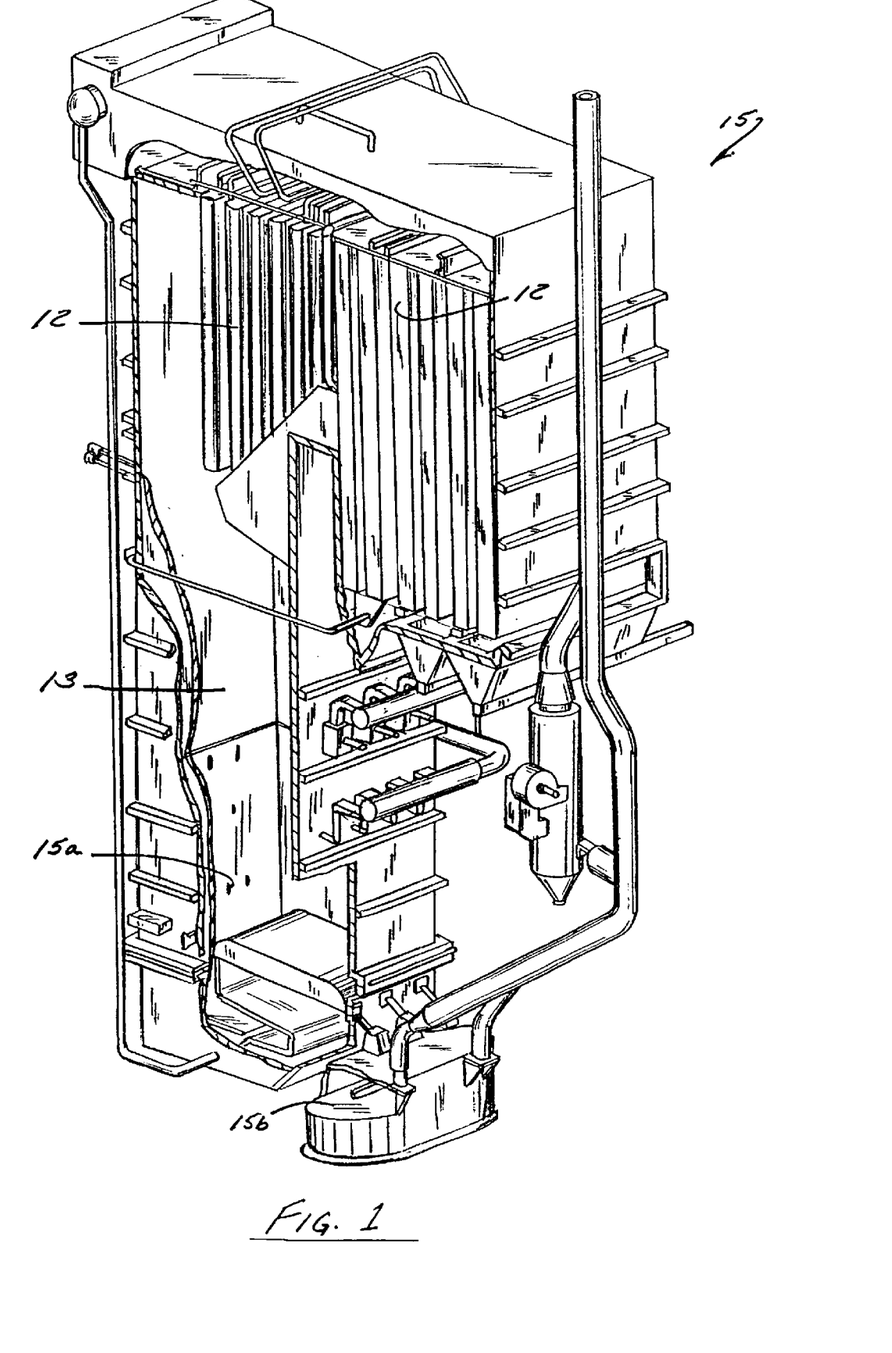
FIG. 1 is a sectional side elevational view of a conventional boiler.

Referring to FIG. 1, the deslagging system of the present invention is preferably used with a conventional basic boiler 15 common in industry. Such a boiler 15 is typically fueled by coal or oil and which produce steam for driving the turbines of the plant is shown. The boiler includes a firebox 13 in which during times of operation intense heat is produced by the burning of coal or oil producing fireballs (not shown). The heat is transferred to the boiler tubes 12. As a result of the burning of coal or oil, slag 111 (FIG. 7) tends to build up on the boiler tubes12 reducing the efficiency of the operation of the boiler 15. Observation portals or windows 15a are present along the walls of the firebox that enable entry into the firebox 13 during the boiler 15 operation. A furnace drain 15b or "monkey hole" exists at the bottom of the firebox 13 near ground-level to allow for drainage of slag deposits or other materials from the boiler 15.

Figure 2:
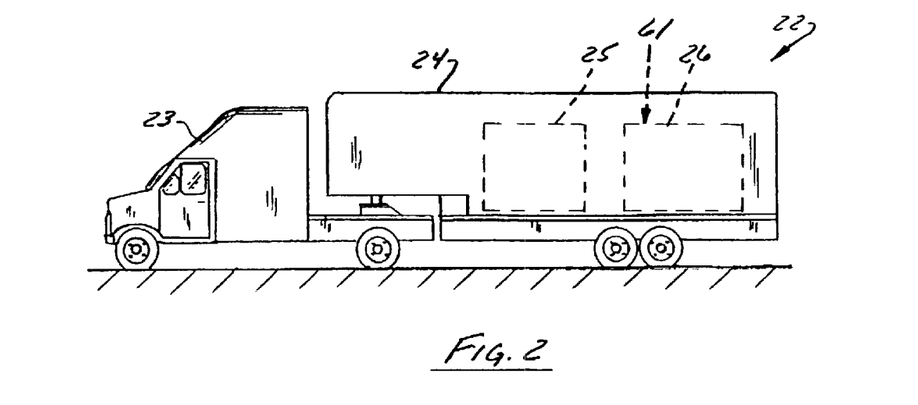
FIG. 2 illustrates one preferred embodiment of a mobile laser deslagging system of the present invention.

FIG. 2 shows the deslagging system of the present invention. The deslagging system is preferably housed in a mobile transport unit 22 which includes a tractor 23 that pulls a trailer 24 houses a laser unit 61. Within trailer 24 is a control room 25 which may have air conditioning to cool the equipment and operator contained therein. The trailer may also have a laser generator area 26. Although this particular embodiment describes the tractor/trailer mobile unit, it is also envisioned by the inventor that the invention could have a number of other means for mobility. Such alternative means include, but are not limited to a van, small cart, backpack etc.

Figure 3:
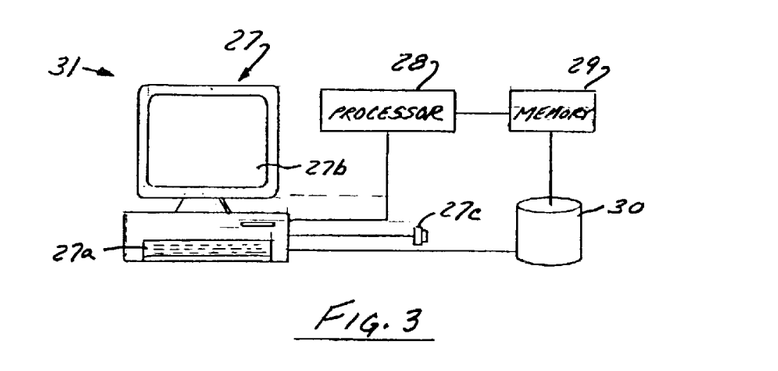
FIG. 3 illustrates one preferred embodiment of a computer control system of the present invention.
Figure 4:
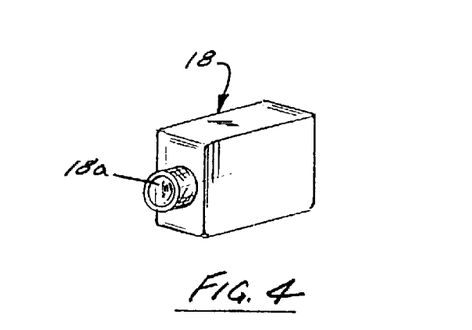
FIG. 4 illustrates one preferred embodiment of a targeting and imaging system of the present invention.

Referring now to FIG. 3, within the control room 25 is the computer control system 31. An operator user interface consists of a conventional computer terminal 27, including an input device such as keyboard 27a, an output device such as a video monitor 27b, processor 28, memory 29, and database 30. A standard computer such as an IBM PC or MacIntosh will suffice. The memory preferably includes laser control and targeting as well as optical feedback software. When activated, the software functions as a laser control and optical feedback circuit for controlling and targeting the laser operating unit 61. The computer system 31 includes a conventional bus 27c interface in order to send and receive signals from the respective peripheral devices. In one preferred embodiment, the computer system has a 800+GHz processor and 500+MB of RAM. The computer system may also include a high-capacity hard drive and a separate cooling system.

Referring now to FIGS. 3, 4, 5, and 6 the computer control system 31 is preferably connected to a measuring system or automated targeting and imaging system 18 and the laser operating unit 61. The targeting and imaging system 18 preferably consists of an optical targeting system or optical sensor 18a for viewing the inside of the boiler 15 (FIG. 1) and the boiler tubes 12 (FIG. 1). In one preferred embodiment, the sensor includes a wide-angle video camera and a telephoto video camera connected in circuit with the computer bus 27c. A conventional video digitizer connected between the camera and the computer bus 27c converts the camera video signals into a digital form recognizable by the computer system 31. Advantageously, the computer 31 selectively relays the signals representative of the respective camera's field of view to the computer monitor 27b for viewing by a crew operator and thus provides real-time visual feedback to the operator in the trailer.

Figure 5:
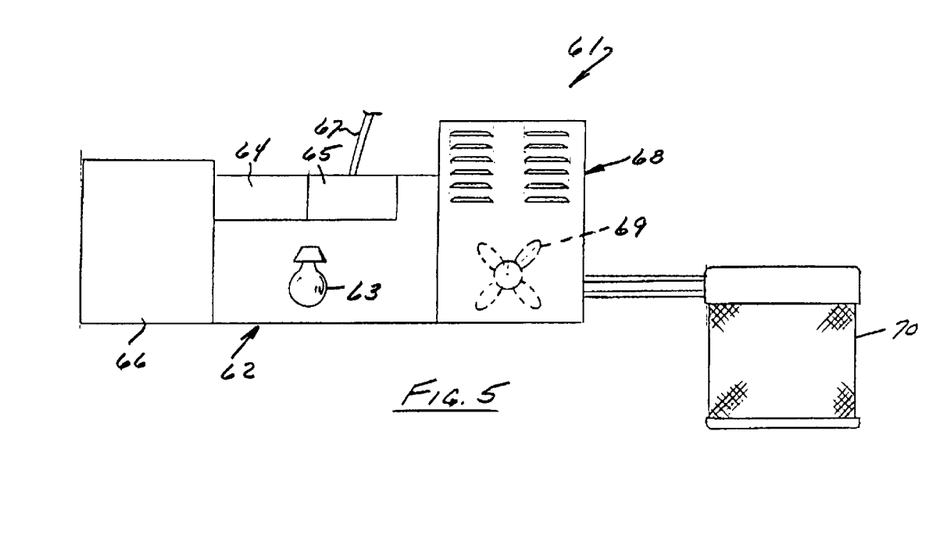
FIG. 5 is a schematic illustrating one preferred embodiment of the laser of the present invention.

Referring now to FIG. 5, connected to the computer bus 27c and stored within the trailer 24 is the laser main unit or laser operating unit 61 (hereinafter simply just "laser") for ablating the slag 111 (FIG. 7) build-up within the boiler 15. The laser 61 includes a power source or unit 66 connected to a laser generator 62. Inside of the laser generator 62 is a flashlamp 63, mixing chamber or pre-chamber 64 and pumping chamber or pump 65. The laser 61 also has a cooling system or unit 68 that preferably includes a fan 69. Also preferably operably integrated into the cooling unit 68 is a heat exchanger 70 containing water and glycol.

The laser 61 is preferably a conventional Q-switched laser which lases in the near infrared wavelength. The laser may also include a conventional laser switch circuit that connects with the computer via the bus and in response to signals therefrom, pulses the laser on and off. The lasing material preferably is a CO2 or a Neodymium (Nd) doped YAG crystal that is excited by pulses of light from flash lamp 63. The YAG crystal is preferably very accurately positioned between two carefully aligned mirrors, with one mirror having transmissive as well as reflective properties, to create a resonant optical cavity or lasing chamber. The flash lamp 63 is used to store energy in the YAG crystal. The Q-switch is positioned within this cavity and connects in circuit to the laser switch circuit. The Q-switch operates under the control of the computer to produce very short, intense laser pulses by enhancing the storage and dumping of energy in and out, respectively, of the laser crystal. The Q-switch in response to signals from the computer via the laser switch circuit is operative to direct a laser pulse through the mirror having the transmissive properties. The laser pulse is preferably an ultra-short, pulsed laser. The laser 61 is preferably pulsed at a rate in which the upper surface layer of slag 111 (FIG. 7) is ablated while minimally affecting the underlying substrate.

When operating while the boiler is on-line, one key feature of the laser is to have enough power to stay focused despite the extremely hot medium or amount or size of the particulates inside the boiler. Further, sufficient laser power is essential because the slag is more plastic and thus more difficult to remove when the boiler is on-line.

In one preferred embodiment, the laser preferably may be a $CO_2$ pulse laser supplied by one of the following: Quantel, Big Sky, STI Optronics. The dimensions of the $CO_2$ pulse laser may be about 30" wide by 48" long and about 48" tall. The top of the laser unit is rounded like a cylinder and is modular in construction. This laser operating unit is preferably cooled with water, and/or by a fan. This laser operating unit uses $CO_2$ as the catalyst for the laser diode and is rated to be at least 10 joules at 1.06 m.

In another preferred embodiment, the laser is a CFR series laser or a Laserblast series. Such a laser typically has a power source that is the size of a toaster and a cooling unit that is a heat exchanger with water and glycol mix. The laser may also include a precipitator.

In another preferred embodiment, the laser beam is preferably invisible to the naked eye and thus is not harmful to an operator's eyes and there is no need to wear protective goggles. In this embodiment, however, the laser beam will be visible on the carbon slag. Here, the beam is approximately 1½" to 2" in diameter.

In yet another embodiment, the laser is a chemical laser referred to as a Coil Laser System (CLS). The primary ingredients of this laser are hydrogen peroxide, sodium or potassium hydroxide and chlorine. The chemicals in the laser are mixed automatically by the CLS and then run through an iodine diode.

In still another embodiment the laser is a sapphire laser with up to 20 joules of power having dimensions of about 48"(w)×60"(l) and about 60"(d) and an aperture approx 4 inches in diameter and travels several kilometers.

The laser may also have a re-filtration unit that reconstitutes the integrity of the gas and in essence recycles the gas. The cycle rate of such a laser beam can range up to 100 Hz.

Figure 6:
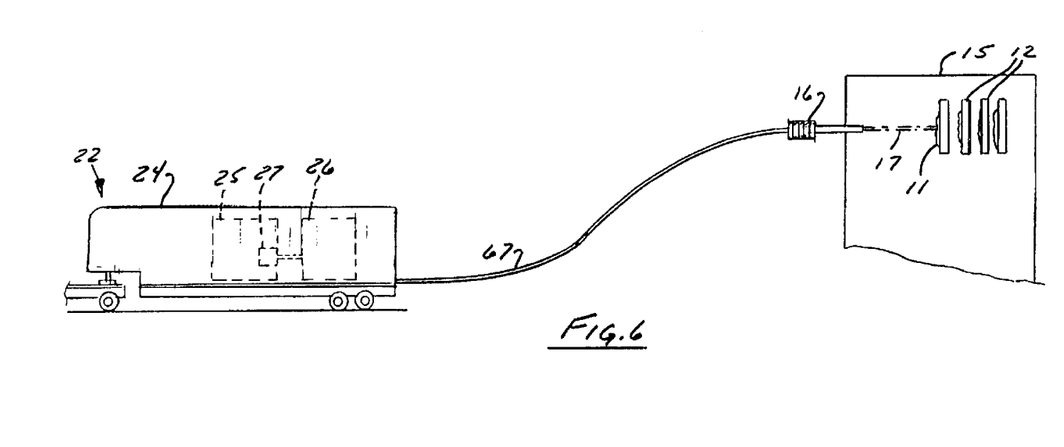
FIG. 6. illustrates one preferred embodiment of the present invention including a fiber optic cable connected to the laser gun.
Figure 7:
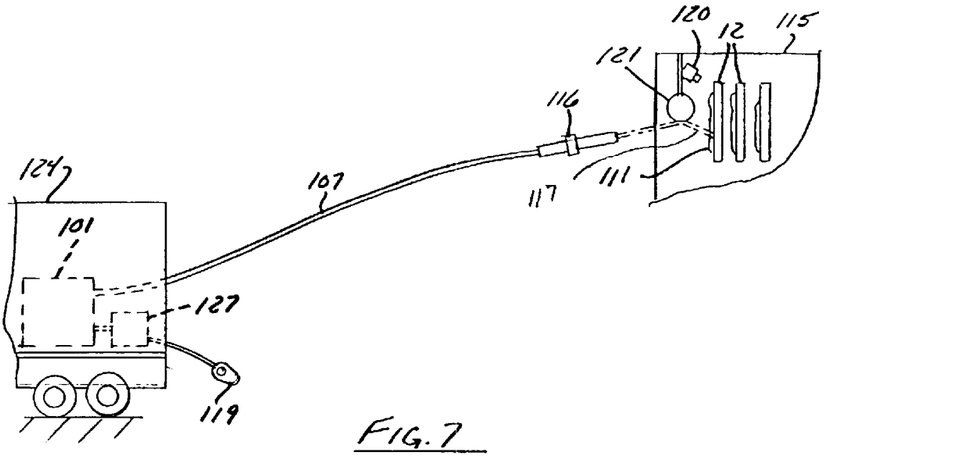
FIG. 7 illustrates another embodiment of the present invention showing a laser deployment ball.

Referring now to FIGS. 5 and 6, the control room 25 and the computer 27 is shown connected to the laser generator area containing laser unit 61. In this embodiment, the unit 61 is connected to the computer controls and power couplings at a first end and connected to a targeting system or laser discharge device or gun 16 via a fiber optic cable 67 at a second end. The fiber optic cable 67 is preferably run from the laser 61 inside the trailer 24 into the boiler 15 where the gun 16 is positioned. The gun 16 discharges the laser raw beam 17 at the control of the computer 27. The raw beam 17 ablates the slag 111 that has been built up in the boiler. Referring now to FIG. 7, another means of deployment is described. A fiber optic cable 107 is run from laser 101 inside trailer 124 to laser gun 116. Next, a reflective ball 121 is suspended from the top of the boiler down inside between the boiler tubes which are in need of being cleaned. The laser gun 116 is first directed into boiler 115 where the ball 121 is positioned. The laser 101 may also include a conventional remote switch circuit 119 that connects with computer controller 127 via the bus and in response to signals therefrom activates portable targeting system 120.

The targeting system 120 likely takes form of a remote camera located preferably on the ball 121 and a beam of visible light projected in parallel with the laser beam 117 so that the operator can see the effect that the laser beam is having on the slag on the tubes inside the boiler.

Next, laser beam 117 is directed at the reflective surface of the ball 121. As the laser beam 117 hits one mirror on the ball 121, the ball rotates and the reflected laser beam moves across the length of the tube. The laser ball 121 with its mirrored or reflective surface operates to move the laser beam across the tubes much like an old-fashioned typewriter moves the typed letters across the blank page.

As the beam moves across the tube, the system 120 focuses on the slag and pulses the laser on and off as needed. In this manner, ball 121 discharges laser beam 117 at various. Thus, the laser beam 117 is able to ablate the slag 111 that has been built up in the boiler in hard to reach places.

3. In Use and Operation

Figure 8:
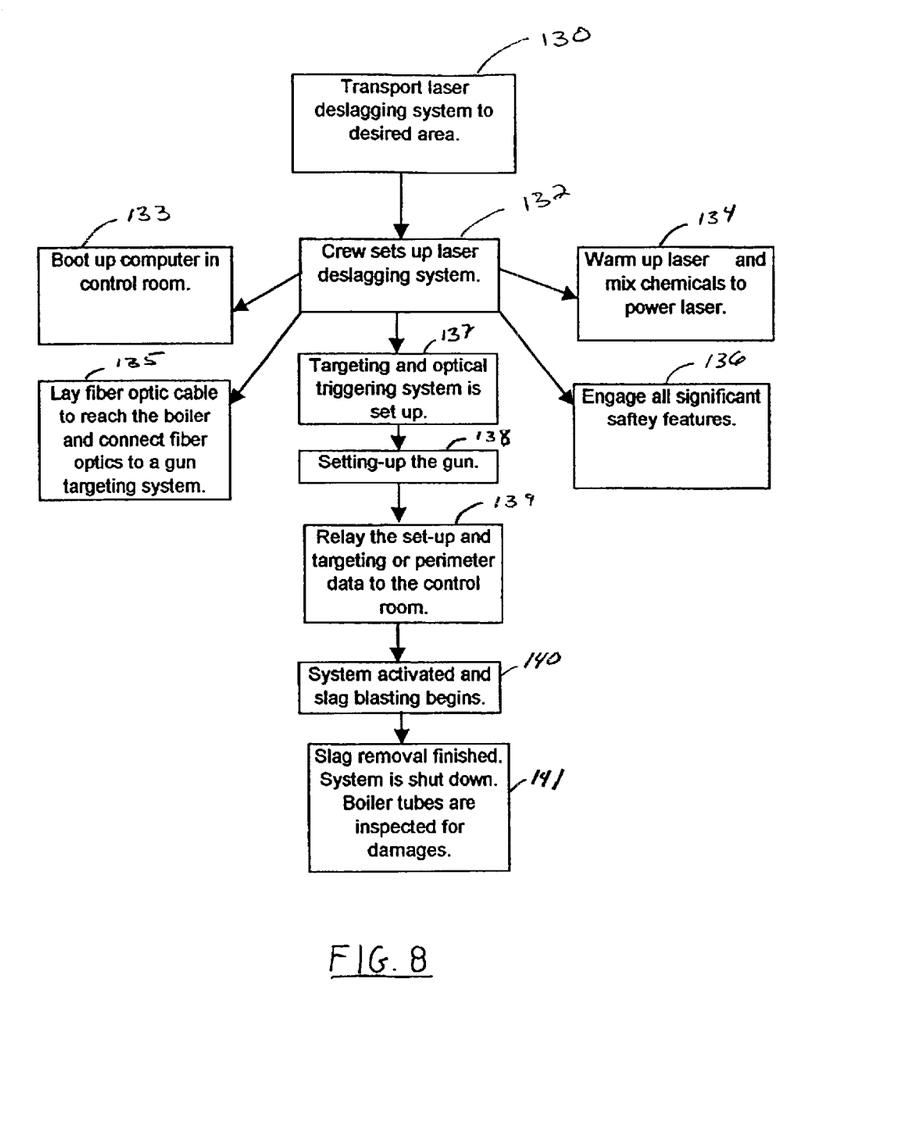
FIG. 8 is a flowchart showing a preferred method of using the invention.
Figure 9:
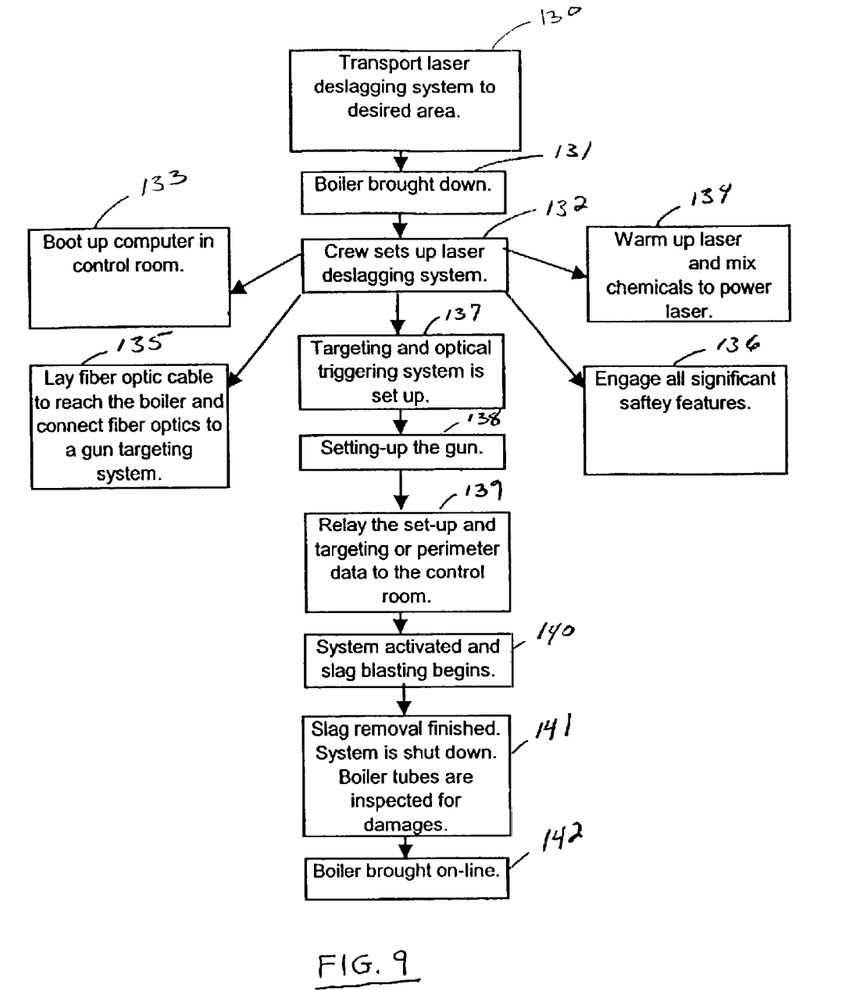
FIG. 9 is a flowchart showing another method of using the invention.

As shown in FIGS. 8 and 9, when in use and operation the boiler deslagging process consists of transporting a deslagging system via preferably the tractor-trailer to the boiler location within a power plant facility (Step 130).

A 2-4 person crew would begin to set-up the deslagging system 5 (Step 132). The crew is preferably formed of at least one operator, a supervisor, and at least one control room person. The crew is preferably trained to be interchangeable with each other and intimately knowledgeable of the systems they are operating. It is also beneficial if the crew members have overlapping job duties so that efficiency and safety are maximized.

Initially, the crew would boot-up computer 31 in control room (Step 133) and begin warming up laser operating main unit (Step 134). The warming process includes mixing chemicals to power the laser. The crew would next lay-out the fiber optic cable needed to reach the boiler (Step 135). The fiber optics connect the gun or targeting system and the laser.

In one preferred embodiment (FIG. 8), the boiler remains on-line will the cleaning of the tubes occurs. However, in alternative embodiment shown in FIG. 9, the boiler is temporarily brought off line (Step 131) for safety reasons and to maximize cleaning effectiveness and thoroughness.

The crew would next ensure significant safety features on the system are fully engaged (Step 136) and take all necessary precautions to safeguard inadvertent triggering of the laser. The gun or targeting and optical triggering system is then set-up (Step 137). Next, the operators manually or automatically relay the set-up and targeting or perimeter data to the control room (Step 139). Targeting information is then received from the control room and the system is ready to be activated. Once activated, the system 5 blasts the slag from the boiler's internal structures (Step 140).

The crew preferably operates the system to remove slag from internal structures within the boiler starting from the bottom of the boiler and working toward the top. By working the laser beam up the tubes within the boiler starting from the ground level of the boiler, the foundation of the built-up slag is removed and thus larger sections are likely to crumble, thus quickening the pace of the slag removal.

The laser cleaning process preferably produces a by-product of just ash and thereby greatly reduces the amount of dust created up and other waste products created. The ash is then removed from the boiler via the monkey drain 15.

Once the platenization and other materials are removed from tubes the tubes are likely to be inspected by power plant personal (Step 141) to ensure no destruction such as grooving or pitting has occurred. Once the inspection is complete and everything is in order, the boiler may be brought completely back on-line (FIG. 9) (Step 142).

Although the best mode contemplated by the inventors of carrying out the present invention is disclosed above, practice of the present invention is not limited thereto. It will be manifest that various additions, modifications and rearrangements of the features of the present invention may be made without deviating from the spirit and scope of the underlying inventive concept.

For example, the YAG laser could be could be enhanced by providing the relevant laser technology existing at the time. Similarly, although tractor/trailer configuration is described, any number of mechanisms to make the laser portable could be used in its place. In addition, the individual components need not be fabricated from the disclosed materials, but could be fabricated from virtually any suitable materials.

It is intended that the appended claims cover all such additions, modifications and rearrangements. Expedient embodiments of the present invention are differentiated by the appended dependent claims.

What is claimed is:

1. A boiler deslagging system comprising: a laser for removing slag from a boiler; a targeting system having a laser gun operationally connected to the laser; and a computer system for controlling the operation of the laser and targeting system, wherein the targeting system is driven by a laser targeting software and wherein the targeting system includes an optical targeting system.

2. The deslagging system of claim 1 wherein the laser is comprised of a chemical laser having at least one of: hydrogen peroxide, sodium hydroxide, potassium hydroxide, and chlorine.

3. The deslagging system of claim 1 wherein laser includes a mixing pre-chamber, a pump connected to the pre-chamber, and an iodine laser diode connected to the pump.

4. A slag removal system for a boiler comprising:
   a mobile trailer including a control room; a main laser operating unit connected with the trailer; a portable optical targeting system operationally connected to the laser unit;
   a computer in the control room for operating the laser unit and the targeting system;
   fiber optic cable connecting the targeting system and the laser unit; and wherein the laser unit includes a power source, and a cooling system.

5. A method of deslagging a boiler while the boiler is still in operation comprising the steps of:

transporting a deslagging system;
setting-up the deslagging system including the steps of;
  booting-up a computer in a control room,
  warming up a laser to include mixing chemicals to power a laser,
  laying-out fiber optics needed to reach the boiler, and connecting the fiber optics to a gun targeting system and the laser;
setting-up the gun;
relaying the set-up information to the control room;
feeding targeting information from the control room;
activating the deslagging system; and
operating the deslagging system to remove slag from internal structures within the boiler.

6. The method of claim 5, further comprising the steps of:
training personnel to operate the deslagging system.

7. The method of claim 5, further comprising the steps of:
removing the slag starting from the bottom of the boiler.

8. The method of claim 5, further comprising the steps of:
applying the laser beam to the slag build up in the tubes within the boiler starting from the ground level of the boiler and proceeding in an upward direction.

9. The method of claim 5, further comprising the steps of:
cleaning a boiler to produce a by-product of ash; and reducing the amount of dust created.

10. The method of claim 5, further comprising the step of removing platenization from the tubes for a non-destructive inspection.

11. A system for extending the typical maintenance schedule of a power plant comprising:
an on-line boiler including walls, an observation portal and a boiler tube having surfaces;
a laser main unit having a laser which does not pit and groove the surfaces of the tube and reduces the mess normally associated with tube cleaning;
a fiber optic cable connected to the laser main unit;
a gun connected to the cable for targeting and safely removing slag from the boiler tube through the observation portal outside the walls of a boiler; and
a measuring system to help determine the distance the slag is from the portal.

12. The system of claim 11, further comprising a computer control system for a deslagging laser comprising:
a rugged design for handling environments in a power plant;
a storage device containing individual boiler parameter data.

13. The system of claim 12, wherein the computer control systems is located in a trailer.

14. The system of claim 13, further comprising a wireless controller for targeting and imaging inside the boiler while online.

15. The system of claim 13, wherein the storage device includes reference points from the observation portal to the tube and from the portal.

16. The system of claim 15, wherein the reference points are accessed in at least one of the following ways: from on the tubes, from outside the boiler, and as electronic files to provide a fixed spot to start and reference from, and wherein the points are updated regularly to record any changes to the inside of the boiler.

17. The system of claim 15, wherein the computer system includes 800+ GHz processor and 500+ MB of ram, a high-capacity hard drive, and a system to cool the computers.

18. The system of claim 15, wherein the laser has, a front and a rear, and the front of the laser is cooled by an air curtain between the observation portal and the laser, said air curtain is comprised of at least one of: cold air and a nitrogen gas.

19. The system of claim 18, wherein the laser further comprises a sapphire crystal, an optical system, and a power generator for appropriately powering the laser to affect the slag material and not the boiler tube substrate;
wherein the laser heats the slag to the point in which the slag falls off the tube surface;
wherein the laser is properly calibrated to take into account the wavelength of light inside the boiler and the light generated by the laser-heated slag;
wherein the laser is calibrated to take into account the airflow inside the boiler; and
wherein the laser is calibrated according to the thickness of the slag build up on the tubes.

20. The deslagging system of claim 1 further comprising:
a fiber optic cable connecting to the laser to the laser gun, wherein the laser is located in a mobile trailer and the laser gun is remotely located at the boiler in reference to the mobile trailer;
a measuring system configured to determine a position of slag removal in reference to an observation portal of the boiler; and
a wireless controller for targeting and imaging slag removal inside the boiler,
wherein the laser is properly calibrated to take into account the wavelength of light inside the boiler and the light generated by a laser-heated slag, and
wherein the laser is calibrated to take into account an airflow inside the boiler.

* * * * *